United States Patent
Chang et al.

(10) Patent No.: US 7,092,216 B1
(45) Date of Patent: Aug. 15, 2006

(54) DISK DRIVES AND ACTUATOR ASSEMBLIES HAVING A PAIR OF BONDED VOICE COIL SUPPORTING ARMS

(75) Inventors: Ken L. Chang, Saratoga, CA (US); Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 151 days.

(21) Appl. No.: 10/632,351

(22) Filed: Jul. 31, 2003

(51) Int. Cl.
*G11B 21/08* (2006.01)
*G11B 5/55* (2006.01)

(52) U.S. Cl. .................... 360/265.9; 360/265.8
(58) Field of Classification Search .......... 360/265.9, 360/266, 265.8, 264.7, 264.1, 264, 260, 240
See application file for complete search history.

(56) References Cited

U.S. PATENT DOCUMENTS

| | | | |
|---|---|---|---|
| 6,636,383 B1 | 10/2003 | Chew | 360/245.9 |
| 6,683,756 B1 * | 1/2004 | Zhao et al. | 360/265.08 |
| 6,687,094 B1 * | 2/2004 | Liu et al. | 360/265.7 |
| 6,728,072 B1 | 4/2004 | Van Sloun et al. | 360/244.6 |
| 6,836,387 B1 * | 12/2004 | Ohba et al. | 360/97.01 |
| 6,982,853 B1 * | 1/2006 | Oveyssi et al. | 360/265.9 |
| 2003/0076633 A1 | 4/2003 | MacPherson et al. | 360/265.7 |

* cited by examiner

*Primary Examiner*—Julie Anne Watko
(74) *Attorney, Agent, or Firm*—Alan W. Young, Esq.; Joshua C. Harrison, Esq.

(57) ABSTRACT

An actuator arm assembly for a disk drive includes first and second stamped actuator arms including first and second arm portions, first and second body portions defining first and second body surfaces, and first and second coil-supporting arm portions defining first and second pairs of coil supporting arms for supporting a coil portion of a voice coil motor. When the first and second stamped actuator arms are attached to one another, the first pair of coil supporting arms faces and is in contact with the second pair of coil supporting arms to define first and second coil attachment surfaces, and the first body surface faces and is in contact with the second body surface to define a third coil attachment surface.

11 Claims, 5 Drawing Sheets

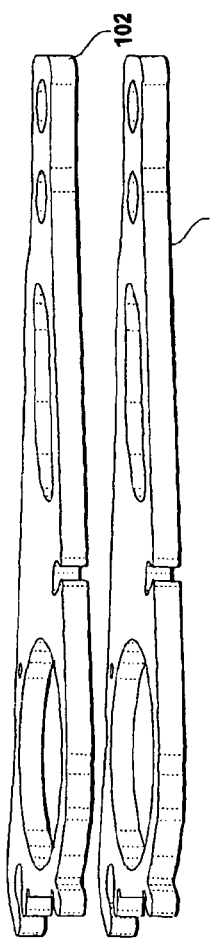
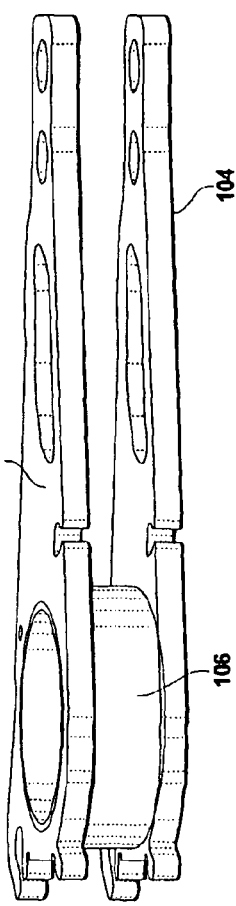
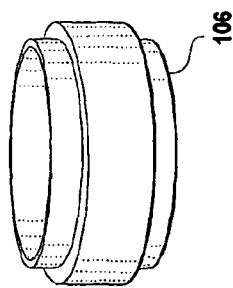
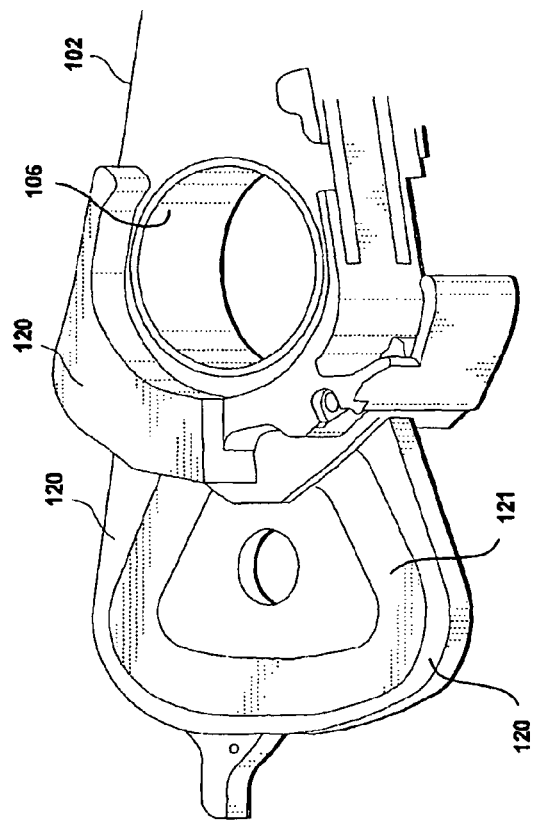
FIG. 1A (Prior Art)
FIG. 1B (Prior Art)
FIG. 1C (Prior Art)

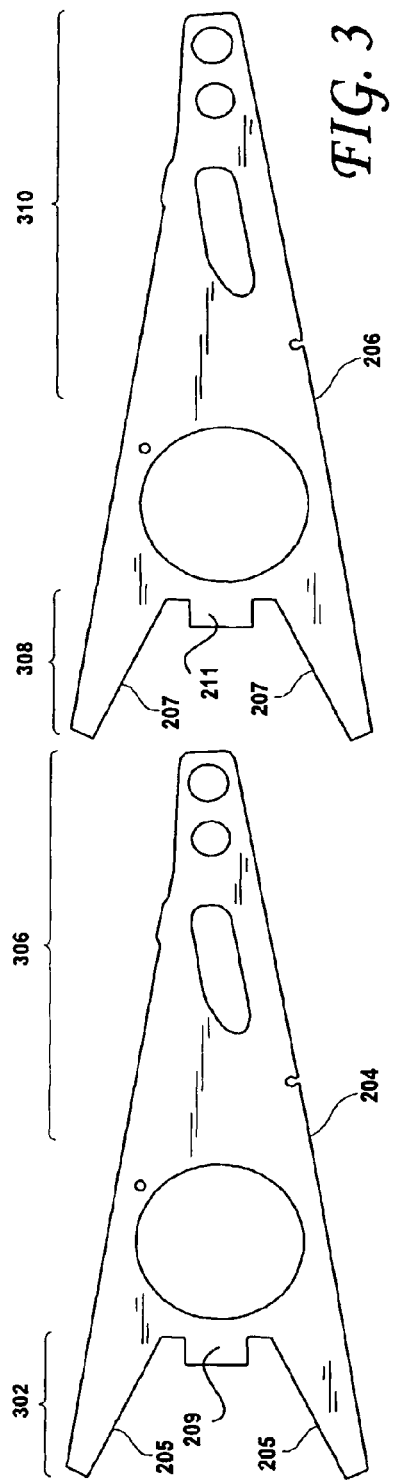
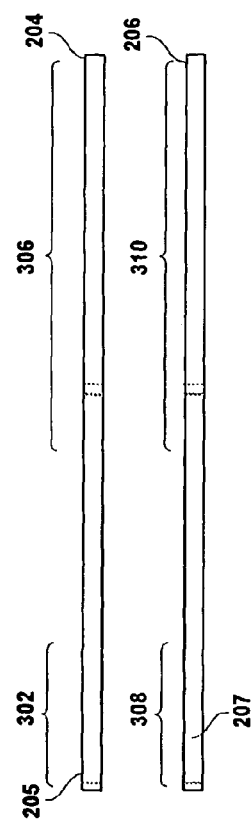
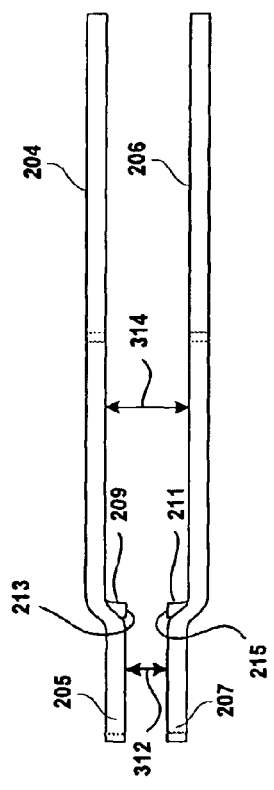
FIG. 3
FIG. 4
FIG. 5

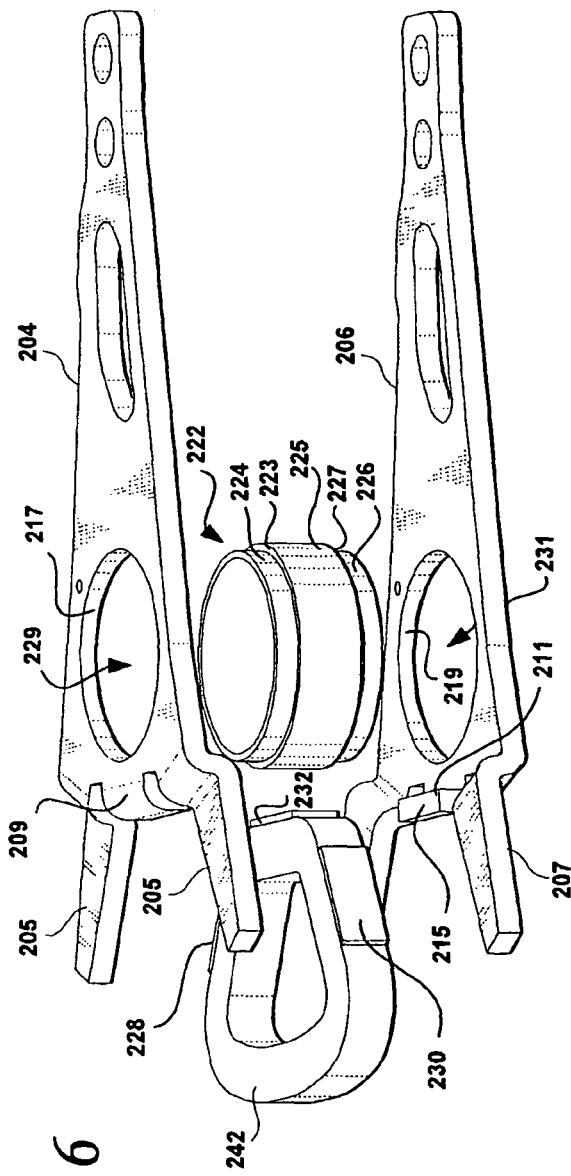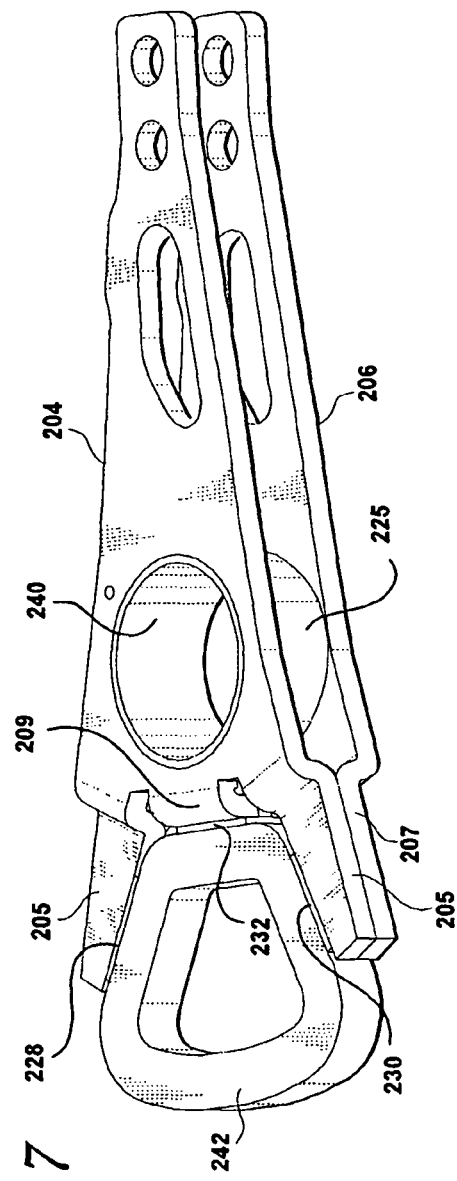
FIG. 6
FIG. 7

DISK DRIVES AND ACTUATOR ASSEMBLIES HAVING A PAIR OF BONDED VOICE COIL SUPPORTING ARMS

BACKGROUND OF THE INVENTION

1. Field of the Invention

The present invention relates to disk drives. More particularly, the present invention relates to actuator arm assemblies, constituent parts thereof and methods of making such actuator arm assemblies.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator arm assembly that moves in response to the servo control system; (2) a head gimbal assembly ("HGA") that extends from the actuator arm assembly and biases the slider toward the disk; and (3) a flex cable assembly that provides an electrical interconnect with minimal constraint on movement. Coupled to the actuator arm assembly is a coil portion of a voice coil motor (VCM).

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

FIG. 1A shows an exploded view of portions of a conventional actuator arm assembly that includes two stamped actuator arms. FIG. 1B shows the portions of the conventional actuator arm assembly of FIG. 1A, with the collar fitted to the two stamped actuator arms. Considering now FIGS. 1A and 1B collectively, the portions of the conventional actuator arm assembly shown include a first actuator arm 102, a second actuator arm 104 and an actuator assembly collar 106. A chemical polishing step may be carried out to polish the surfaces of the actuator arms and to remove any unwanted artifacts of the stamping process. The collar 106 may then be fitted to both actuator arms 102, 104, which stiffens the resultant actuator arm assembly 100. Part FIG. 1C shows a portion of a conventional actuator arm assembly. The arm assembly shown in FIG. 1C is fitted with the collar 106 and with the coil portion 121 coupled to the arm assembly by means of a plastic overmold 120. Even though the actuator arms 102, 104 are mechanically coupled to one another by the collar 106, and the coil portion 121 is fitted to the arm assembly by means of a plastic overmold 120, the resultant aggregate structure nevertheless still suffers from unwanted resonance modes, which detrimentally affect the performance of the disk drive in which such a conventional actuator arm assembly is utilized.

From the foregoing, it may be appreciated that less costly and higher performing actuator arm assemblies are desirable.

SUMMARY OF THE INVENTION

Accordingly, an embodiment of the present invention may be regarded as an actuator arm assembly for a disk drive. The actuator arm assembly may include a first stamped actuator arm and a second stamped actuator arm. The first stamped actuator arm may include a first arm portion, a first body portion defining a first body surface, the first stamped actuator arm further including a first coil-supporting arm portion defining a first pair of coil supporting arms for supporting a coil of a voice coil motor. The second stamped actuator arm may include a second arm portion, a second body portion defining a second body surface, the second stamped actuator arm further including a second coil-supporting arm portion defining a second pair of coil supporting arms for supporting the coil of the voice coil motor. The first and second stamped actuator arms are configured such that when the first stamped actuator arm is attached to the second stamped actuator arm, the first pair of coil supporting arms faces and is in contact with the second pair of coil supporting arms to define first and second coil attachment surfaces, and the first body surface faces and is in contact with the second body surface to define a third coil attachment surface.

According to further embodiments, the first, second and third coil attachment surfaces may be configured to enable the coil to be attached to the actuator arm assembly by a first layer of adhesive between the first coil attachment surface and the coil, by a second layer of adhesive between the second coil attachment surface and the coil and by a third layer of adhesive between the third coil attachment surface and the coil. The first stamped actuator arm may define a first surface that defines a first through bore and the second stamped actuator arm may define a second surface that defines a second through bore. A collar may be fitted within the first and second through bores.

According to another embodiment thereof, the present invention is also a head stack assembly for a disk drive. The head stack assembly may include an actuator arm assembly that includes a first stamped actuator arm, the first actuator arm including a first arm portion, a first body portion defining a first body surface, the first stamped actuator arm further including a first coil-supporting arm portion defining a first pair of coil supporting arms for supporting a coil of a voice coil motor; a second stamped actuator arm, the second stamped actuator arm including a second arm portion, a second body portion defining a second body surface, the second stamped actuator arm further including a second coil-supporting arm portion defining a second pair of coil supporting arms for supporting the coil of the voice coil motor. The first and second stamped actuator arms may be configured such that when the first stamped actuator arm is attached to the second stamped actuator arm, the first pair of coil supporting arms faces and is in contact with the second pair of coil supporting arms to define first and second coil attachment surfaces, and the first body surface faces and is in contact with the second body surface to define a third coil attachment surface. A first head gimbal assembly may be coupled to the actuator arm assembly, and a coil portion may be attached to the first, second and third coil attachment surfaces.

The present invention is also a disk drive, comprising a disk; a head stack assembly for reading and writing to the disk, the head stack assembly include an actuator arm assembly to which a first head gimbal assembly is coupled, and a coil portion. The actuator arm assembly may include a first stamped actuator arm, the first actuator arm including a first arm portion, a first body portion defining a first body surface, the first stamped actuator arm further including a first coil-supporting arm portion defining a first pair of coil supporting arms for supporting a coil of a voice coil motor; and a second stamped actuator arm, the second stamped actuator arm including a second arm portion, a second body portion defining a second body surface, the second stamped actuator arm further including a second coil-supporting arm portion defining a second pair of coil 1 supporting arms for supporting the coil of the voice coil motor. The first and second stamped actuator arms may be configured such that when the first stamped actuator arm is attached to the second stamped actuator arm, the first pair of coil supporting arms faces and is in contact with the second pair of coil supporting arms to define first and second coil attachment surfaces, and the first body surface faces and is in contact with the second body surface to define a third coil attachment surface. The coil portion may be attached to the first, second and third coil attachment surfaces.

The coil portion may be attached to the first, second and third coil attachment surfaces by adhesive. For example, the first, second and third coil attachment surfaces may be configured to enable the coil portion to be attached to the actuator arm assembly by a first layer of adhesive between the first coil attachment surface and the coil portion, by a second layer of adhesive between the second coil attachment surface and the coil portion and by a third layer of adhesive between the third coil attachment surface and the coil portion. A second head gimbal assembly may be coupled to the second actuator arm portion. The first stamped actuator arm may define a first surface that defines a first through bore, and the second stamped actuator arm may define a second surface that defines a second through bore. The head stack assembly may also include a collar fitted within the first and second through bores. The foregoing and other features of the invention are described in detail below and set forth in the appended claims.

BRIEF DESCRIPTION OF THE DRAWINGS

FIG. 1A shows an exploded view of some of the constituent parts of a conventional stamped actuator arm assembly.

FIG. 1B shows the stamped actuator arm assembly of FIG. 1A, with the collar fitted to the two stamped actuator arms.

FIG. 1C shows a portion of a conventional actuator arm assembly, and shows the coil portion of the VCM coupled to the actuator arm assembly by means of a plastic overmold.

FIG. 3 shows a top view of two stamped actuator arms of an actuator arm assembly according to an embodiment of the present invention.

FIG. 4 shows a side view of the two stamped actuator arms of FIG. 3, prior to any bending thereof.

FIG. 5 shows a side view of the two stamped actuator arms of FIG. 4 in a bent configuration.

FIG. 6 is an exploded perspective view of an actuator arm assembly according to an embodiment of the present invention.

FIG. 7 shows the actuator arm assembly of FIG. 6, in an assembled state.

DESCRIPTION OF THE PREFERRED EMBODIMENTS

Figure 2A:
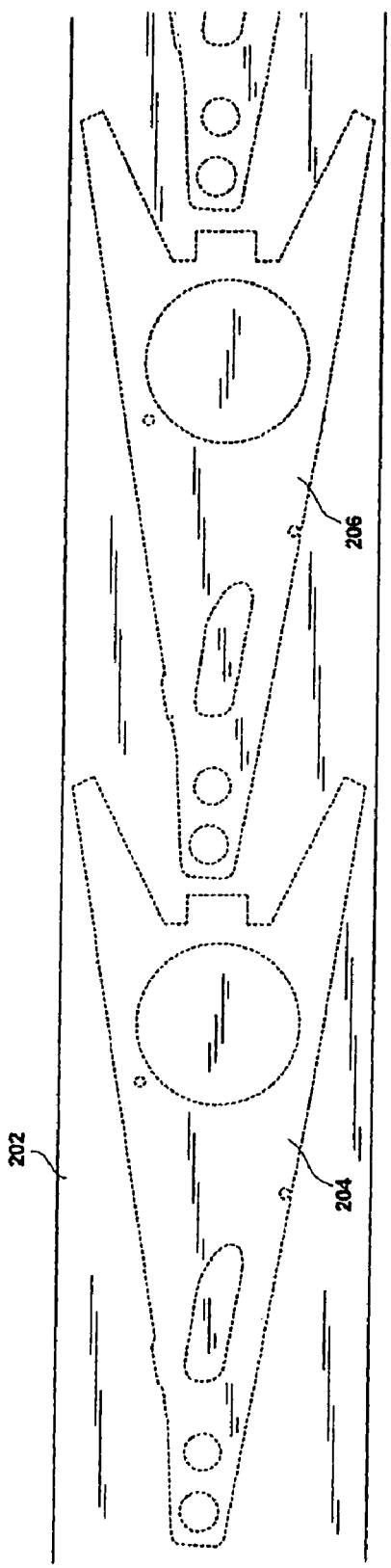
FIG. 2A shows aspects of the method of making a stamped actuator arm assembly, according to an embodiment of the present invention.
Figure 2B:
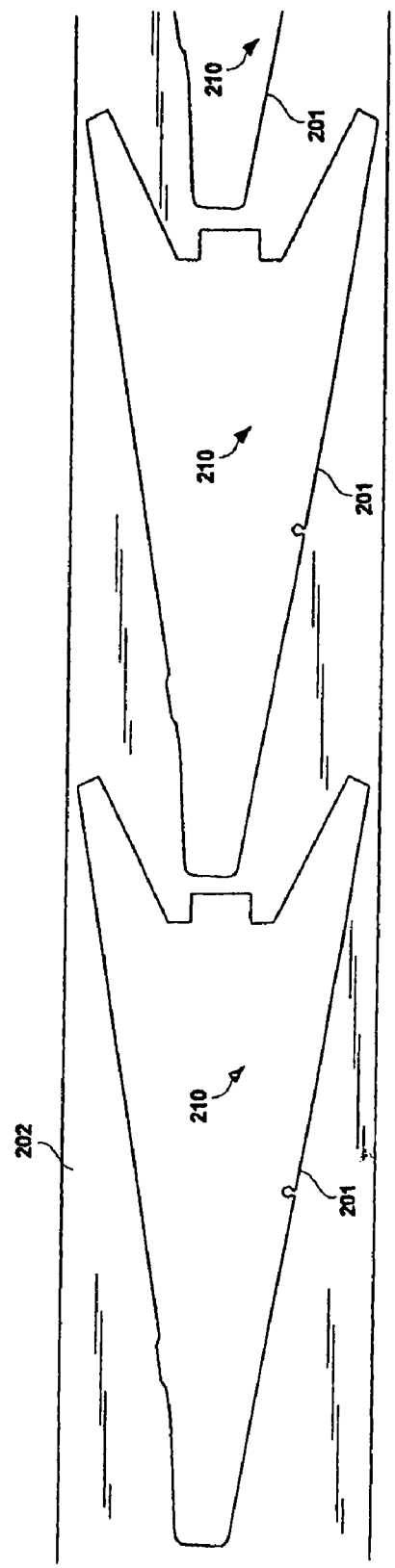
FIG. 2B shows further aspects of the method of making a stamped actuator arm assembly, according to an embodiment of the present invention.

Embodiments of the present invention call for the actuator arms to be made from a stamping process. FIGS. 2A and 2B show aspects of the method of making an actuator arm assembly for a disk drive. The actuator arm assembly, according to an embodiment of the present invention, may include a first stamped actuator arm 204 and a second stamped actuator arm 206. The first and second stamped actuator arms 204, 206 may be made by providing a flat sheet of material 202, such as a flat sheet of steel, for example. The embodiment of the present invention shown in FIGS. 2A and 2B shows the flat sheet of material 202 as being only sufficiently wide to accommodate a single file train of stamped actuator arms. However, the present invention is not limited to such sheets, as the sheet utilized may be dimensioned so as to allow several actuator arms to be stamped in a side-to-side fashion. In any event, in the embodiment shown in FIGS. 2A and 2B, the sheet of material 202 is dimensioned so as to allow a plurality of actuator arms to be formed in a serial fashion, one behind the other. The outlines of the actuator arms 204, 206 to be stamped from the sheet of material 202 are shown in FIG. 2A in dashed lines. FIG. 2B shows the 11 sheet of material 202 in which are defined the outlines 201 of the actuator arms that are obtained from the stamping process according to an embodiment of the present invention. Indeed, after the actuator arms have been stamped from the sheet of material 202, the edges of the sheet 202 cut along the outline 201 by the stamping process define the shape of the resultant actuator arms. After the stamping process, the sheet of material 202, therefore, defines voids 210 having the external outline of the actuator arms.

FIG. 3 shows the resultant first and second stamped actuator arms 204 and 206, as stamped from the sheet of material 202. FIG. 4 shows a side view of the first and second stamped actuator arms 204, 206, in an orientation in which they are disposed one above another. FIGS. 3 and 4 show the first and second stamped actuator arms 204 and 206 after the stamping process, but before they are bent and made to assume their final configuration, according to an embodiment of the present invention. As shown, the first stamped arm 204 stamped from the sheet of material 202 defines a first coil-supporting portion 302 and a first arm portion 306. The first coil-supporting portion 302 defines a first pair of coil-supporting arms, referenced at numeral 205. The first stamped actuator arm 204 also defines a first body portion 209, shown between the first pair of coil-supporting arms 205 in the embodiment of FIG. 3. Similarly, the second stamped arm 206 defines a second coil-supporting portion 308 and a second arm portion 310. The second coil-supporting 308 portion defines a second pair of coil supporting arms, referenced at numeral 207. The second stamped actuator arm 206 also defines a second body portion 211, shown between the second pair of coil-supporting arms 207 in the embodiment of FIG. 3. Although the first and second coil-supporting portions 203, 208 are shown as being of the same thickness as the first and second arm portions 306, 310, they need not be. Indeed, the first and second coil-supporting portions may be thinner than the first and second arm portions 306, 310. For example, the first and second coil-supporting portions may be coined prior to the stamping and bending processes.

FIG. 5 is a side view of the first and second stamped actuator arms 204, 206 after the stamping process and after selected portions of the actuator arms 204, 206 have been bent. As shown, the first and second stamped actuator arms 204, 206 are bent in a mirrored orientation relative to one another. Specifically, the pair of coil-supporting arms 205 of the first stamped actuator arm 204 may be bent such that each of its constituent coil-supporting arms 205 is aligned along a plane that is parallel to but offset from the plane of the first arm portion 306. The second stamped actuator arm 206 is bent in a similar manner such that when the first and second stamped actuator arms 204, 206 are aligned with and facing each other as shown in FIG. 5, the distance 312 separating the major surface of the first and second pairs of coil-supporting arms 302, 308 is smaller than the distance 314 separating the major surfaces of the first and second arm portions 306, 310. The first body portion 209 may also be bent at a ninety-degree angle, such that the first body surface 213 thereof is parallel to the major surfaces of the first pair of coil-supporting arms 302 and the first arm portion 306. Likewise, the second body portion 211 may also be bent at a ninety-degree angle, such that the second body surface 215 thereof is parallel to the major surfaces of the second pair of coil-supporting arms 308 and the second arm portion 310. Indeed, the first and second body portions 209, 211 may be bent such that, when the first and second stamped actuator arms 204, 206 are aligned with and facing each other as shown in FIG. 5, the first body surface 213 is aligned with and faces the second body surface 215.

FIG. 6 is an exploded perspective view of an actuator arm assembly according to an embodiment of the present invention. FIG. 7 shows the actuator arm assembly of FIG. 6, in an assembled state. Considering now FIGS. 6 and 7 collectively, it becomes apparent that, in their bent state, the first and second stamped actuator arms 204, 206 are configured such that when the first stamped actuator arm 204 is attached to the second stamped actuator arm 206, the first pair of coil supporting arms 205 faces and is in contact with the second pair of coil supporting arms 207 to define first and second coil attachment surfaces. Also, in this state, the first body surface (213, shown in FIG. 5) of the first body portion 209 faces and is in contact with the second body surface 215 of the second body portion 211 to define a third coil attachment surface.

To further stiffen the actuator arm assembly, a collar 222 may be fitted between the first and second stamped actuator arms 204, 206. As shown, the collar 222 may be shaped as a right cylinder defining a first lip surface 223 and a second lip surface 227. A first collar surface 224 extends between the first lip surface 223 and a first free end of the collar 222, a second collar surface 225 extends between the first and second lip surfaces 223, 227 and a third collar surface 226 extends between the second lip surface 227 and the second free end of the collar 222. A first surface 217 extending over the thickness of the first stamped actuator arm 204 defines a first through bore 229. Similarly, a second surface 219 extending over the thickness of the second stamped actuator arm 206 defines a second through bore 231. The collar 222 may be fitted to the first and second stamped actuator arms 204, 206 within the first and second through bores 229, 231 such that the first collar surface 224 faces and is in contact with the first surface 217, the first collar surface abuts the first stamped actuator arm 204, the second collar surface abuts the second stamped actuator arm 206 and the third collar surface 226 faces and is in contact with the second surface 219. The collar 222 also defines a smooth internal surface 240. The collar 222 may be secured to the first and second stamped actuator arms 204, 206 through adhesive and/or laser welds, for example. Likewise, the first and second stamped actuator arms 204, 206 may also be secured to one another via adhesive and/or welds, for example.

As shown in FIGS. 6 and 7, a coil portion 242 of a VCM may be attached to the actuator arm assembly. According to an embodiment of the present invention, the first, second and third coil attachment surfaces are configured to enable the coil portion 242 to be attached to the actuator arm assembly by a first layer of adhesive 228 between the first coil attachment surface (a surface collectively formed by one pair of the contacting coil supporting arms 205, 207 that faces the coil portion 242) and the coil portion 242, by a second layer of adhesive 230 between the second coil attachment surface (a surface collectively formed by other pair of contacting coil supporting arms 205, 207 that faces the coil portion 242) and the coil portion 242 and by a third layer of adhesive 232 between the third coil attachment surface (a surface formed by the contacting first and second body portions 209, 211 that faces the coil portion 242) and the coil portion 242. As shown, the coil portion 242 may be secured to the actuator arm assembly without resorting to a plastic overmold process.

Figure 8:
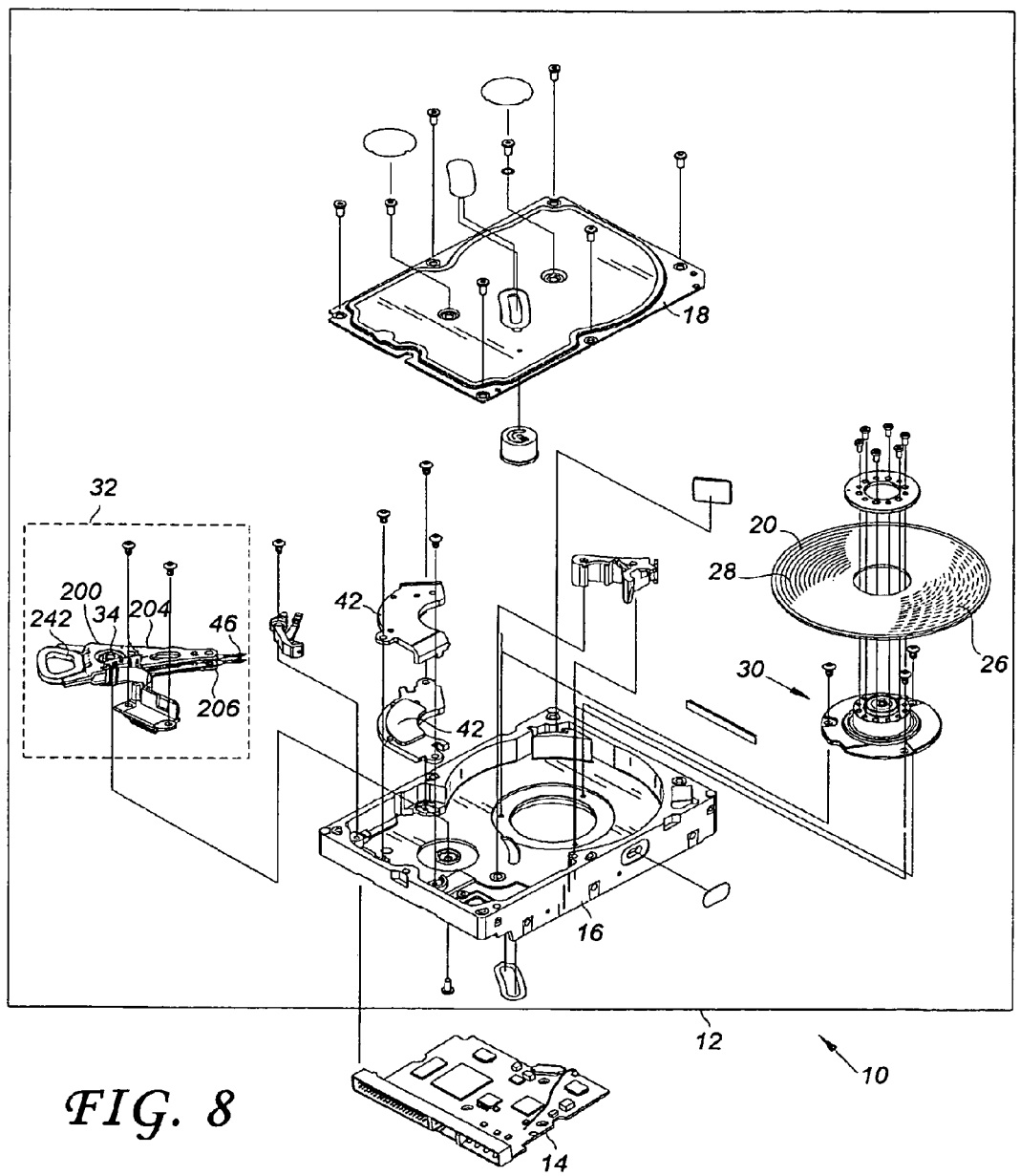
FIG. 8 is an exploded view of a disk drive according to an embodiment of the present invention.

FIG. 8 is an exploded perspective view of a disk drive 10 incorporating aspects of embodiments of the present invention. As shown, the disk drive 10 includes a HDA 12 and a PCBA 14. The HDA 12 includes a disk drive base 16 and a cover 18 that collectively house one or more magnetic disks 20. The magnetic disk 20 contains a plurality of tracks for storing data. The magnetic disk 20 may be two-sided, and thus for example, the magnetic disk 20 is shown having tracks 28 on an upper facing side and tracks 26 (shown in phantom lines) on a lower facing side. The head disk assembly 12 further includes a spindle motor 30 for rotating the magnetic disk 20. The head disk assembly 12 further includes a HSA 32. The head stack assembly 32 includes an actuator arm assembly 200 according to an embodiment of the present invention.

The actuator arm assembly 200 includes a pivot-bearing cartridge 34 engaged within the smooth internal surface 240 of the collar 222 for facilitating the rotation of the arm assembly 200 between limited positions. A coil portion 242 may be coupled to the actuator arm assembly 200. The coil portion 242 extends from the actuator arm assembly 200 to interact with a pair of permanent magnets 42 to form a VCM for pivoting the HSA 32. A head gimbal assembly may be attached to the first actuator arm portion 204 and/or to the second actuator arm portion 206. Each head gimbal assembly includes a head (the uppermost one being denoted 46) for reading and writing data to and from a respective recording surface of the disk 20. In the case wherein only one head gimbal assembly is required (i.e., when the disk 20 only has one recording surface), a compensating weight equivalent to the weight of the missing head gimbal assembly may be attached to the actuator arm portion from which the head gimbal assembly is missing, to preserve the balance of the HSA 32.

The embodiments described and shown herein are illustrative and are not intended to limit the scope of the present invention. Those of skill in this art may recognize that modifications of the described embodiments are possible.

What is claimed is:

1. An actuator arm assembly for a disk drive, comprising:
    a first actuator arm, the first actuator arm including a first arm portion, a first body portion defining a first body surface, the first actuator arm further including a first coil-supporting arm portion defining a first pair of coil supporting arms for supporting a coil of a voice coil motor;
    a second actuator arm, the second actuator arm including a second arm portion, a second body portion defining a second body surface, the second actuator arm further including a second coil-supporting arm portion defining a second pair of coil supporting arms for supporting the coil of the voice coil motor, the second pair of coil supporting arms facing the first pair of coil supporting arms to define first and second coil attachment surfaces, the first body surface facing the second body surface to define a third coil attachment surface, and
    a first layer of adhesive disposed between the first and second pairs of coil supporting arms to attach the first and second actuator arms together.

2. The actuator arm assembly of claim 1, wherein the coil is attached to the actuator arm assembly by a second layer of adhesive between the first coil attachment surface and the coil, by a third layer of adhesive between the second coil attachment surface and the coil and by a fourth layer of adhesive between the third coil attachment surface and the coil.

3. The actuator arm assembly of claim 1, wherein the first actuator arm defines a first surface that defines a first through bore, the second actuator arm defines a second surface that defines a second through bore.

4. The actuator arm assembly of claim 3, further comprising a collar, the collar being fitted within the first and second through bores.

5. The actuator arm assembly of claim 1, further including a fifth layer of adhesive disposed between the first and second body surfaces.

6. A disk drive, comprising:
    a disk;
    a head stack assembly for reading and writing to the disk, the head stack assembly including an actuator arm assembly that comprises:
    a first actuator arm, the first actuator arm including a first arm portion, a first body portion defining a first body surface, the first actuator arm further including a first coil-supporting arm portion defining a first pair of coil supporting arms for supporting a coil of a voice coil motor,
    a second actuator arm, the second actuator arm including a second arm portion, a second body portion defining a second body surface, the second actuator arm further including a second coil-supporting arm portion defining a second pair of coil supporting arms for supporting the coil of the voice coil motor, the second pair of coil supporting arms facing the first pair of coil supporting arms to define first and second coil attachment surfaces, the first body surface facing the second body surface to define a third coil attachment surface, and
    a first layer of adhesive disposed between the first and second pairs of coil supporting arms to attach the first and second actuator arms together;
    a first head gimbal assembly coupled to the actuator arm assembly, and
    a coil portion attached to the first, second and third coil attachment surfaces.

7. The disk drive of claim 6, wherein the coil portion is attached to the actuator arm assembly by a second layer of adhesive between the first coil attachment surface and the coil portion, by a third layer of adhesive between the second coil attachment surface and the coil portion and by a fourth layer of adhesive between the third coil attachment surface and the coil portion.

8. The disk drive of claim 6, further including a second head gimbal assembly coupled to the second actuator arm portion.

9. The disk drive of claim 6, wherein the first actuator arm defines a first surface that defines a first through bore and the second actuator arm defines a second surface that defines a second through bore.

10. The disk drive of claim 9, further comprising a collar, the collar being fitted within the first and second through bores.

11. The disk drive of claim 6, further including a sixth layer of adhesive disposed between the first and second body surfaces.

* * * * *